(12) United States Patent
Kano

(10) Patent No.: US 11,249,381 B2
(45) Date of Patent: Feb. 15, 2022

(54) PROJECTION APPARATUS AND STORAGE MEDIUM

(71) Applicant: CANON KABUSHIKI KAISHA, Tokyo (JP)

(72) Inventor: Atsushi Kano, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 224 days.

(21) Appl. No.: 16/733,382

(22) Filed: Jan. 3, 2020

(65) Prior Publication Data
US 2020/0225567 A1 Jul. 16, 2020

(30) Foreign Application Priority Data
Jan. 10, 2019 (JP) .............................. JP2019-002724

(51) Int. Cl.
- G03B 21/54 (2006.01)
- G03B 21/14 (2006.01)
- G02B 7/04 (2021.01)
- G03B 21/53 (2006.01)

(52) U.S. Cl.
CPC ........... *G03B 21/53* (2013.01); *G03B 21/142* (2013.01); *G02B 7/04* (2013.01)

(58) Field of Classification Search
CPC ...... G03B 21/00; G03B 21/14; G03B 21/142; G03B 21/147; G03B 21/26; G03B 21/005; G03B 21/006; G03B 21/007; G03B 21/53; H04N 9/31; H04N 9/3182; H04N 9/3194; H04N 9/3185; G02B 15/15
See application file for complete search history.

(56) References Cited

U.S. PATENT DOCUMENTS

| | | | |
|---|---|---|---|
| 10,012,815 B2* | 7/2018 | Ichimura | G02B 13/18 |
| 10,983,424 B2* | 4/2021 | Kobayashi | H04N 9/317 |
| 2011/0285973 A1* | 11/2011 | Togino | G03B 21/56 |
| | | | 353/98 |
| 2017/0307966 A1* | 10/2017 | Tanaka | G02B 7/09 |

FOREIGN PATENT DOCUMENTS

| | | |
|---|---|---|
| JP | H03196009 A | 8/1991 |
| JP | 2017126036 A | 7/2017 |
| JP | 2018101932 A | 6/2018 |

* cited by examiner

*Primary Examiner* — William C. Dowling
(74) *Attorney, Agent, or Firm* — Rossi, Kimms & McDowell LLP (57) ABSTRACT

A projection apparatus configured to project a projection image based on image data through a projection optical system that includes a field curvature adjustment lens unit configured to adjust a field curvature in order to focus on a nonplanar projection surface includes a processor configured to generate the image data including information on a focus fixed position where a focus does not change on the projection surface in adjusting the field curvature.

8 Claims, 7 Drawing Sheets

PROJECTION APPARATUS AND STORAGE MEDIUM

BACKGROUND OF THE INVENTION

Field of the Invention

The present invention relates to a projection apparatus having a peripheral focusing mechanism, and a storage medium.

Description of the Related Art

A projection apparatus having a peripheral focusing function for focusing on a curved projection surface has conventionally been known (see Japanese Patent Laid-Open No. 3-196009).

The peripheral focusing is difficult because a focus variation is not constant at each position on the focus surface. The peripheral focusing difficulty can be eased when it is based on a position where the focus is fixed in the projection image (referred to as a focus fixed position hereinafter). The focus fixed position is usually located on the optical axis of the projection optical system, but it is difficult for the user to recognize the focus fixed position. When there is an offset due to the assembly of the projection optical system or when a lens shift is performed, the optical axis or the focus fixed position deviates from the center of the projection surface and it becomes more difficult for the user to recognize the focus fixed position. The focus fixed position is generally point-like, but depending on the lens design and the control of the lens to be operated, the focus fixed position may be annular, and in this case, it becomes more difficult for the user to recognize the focus fixed position.

SUMMARY OF THE INVENTION

The present invention provides a projection apparatus and a storage medium, each of which enables a user to easily perform focusing in adjusting peripheral focusing.

A projection apparatus according to one aspect of the present invention configured to project a projection image based on image data through a projection optical system that includes a field curvature adjustment lens unit configured to adjust a field curvature in order to focus on a nonplanar projection surface includes a processor configured to generate the image data including information on a focus fixed position where a focus does not change on the projection surface in adjusting the field curvature.

A non-transitory computer-readable storage medium according to another aspect of the present invention storing a program that causes to execute a control method a computer in a projection apparatus configured to project a projection image based on image data through a projection optical system that includes a field curvature adjustment lens unit configured to adjust a field curvature in order to focus on a nonplanar projection surface includes generating the image data including information on a focus fixed position where a focus does not change on the projection surface in adjusting the field curvature.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention. Corresponding elements in respective figures will be designated by the same reference numerals, and a duplicate description thereof will be omitted.

Figure 1:
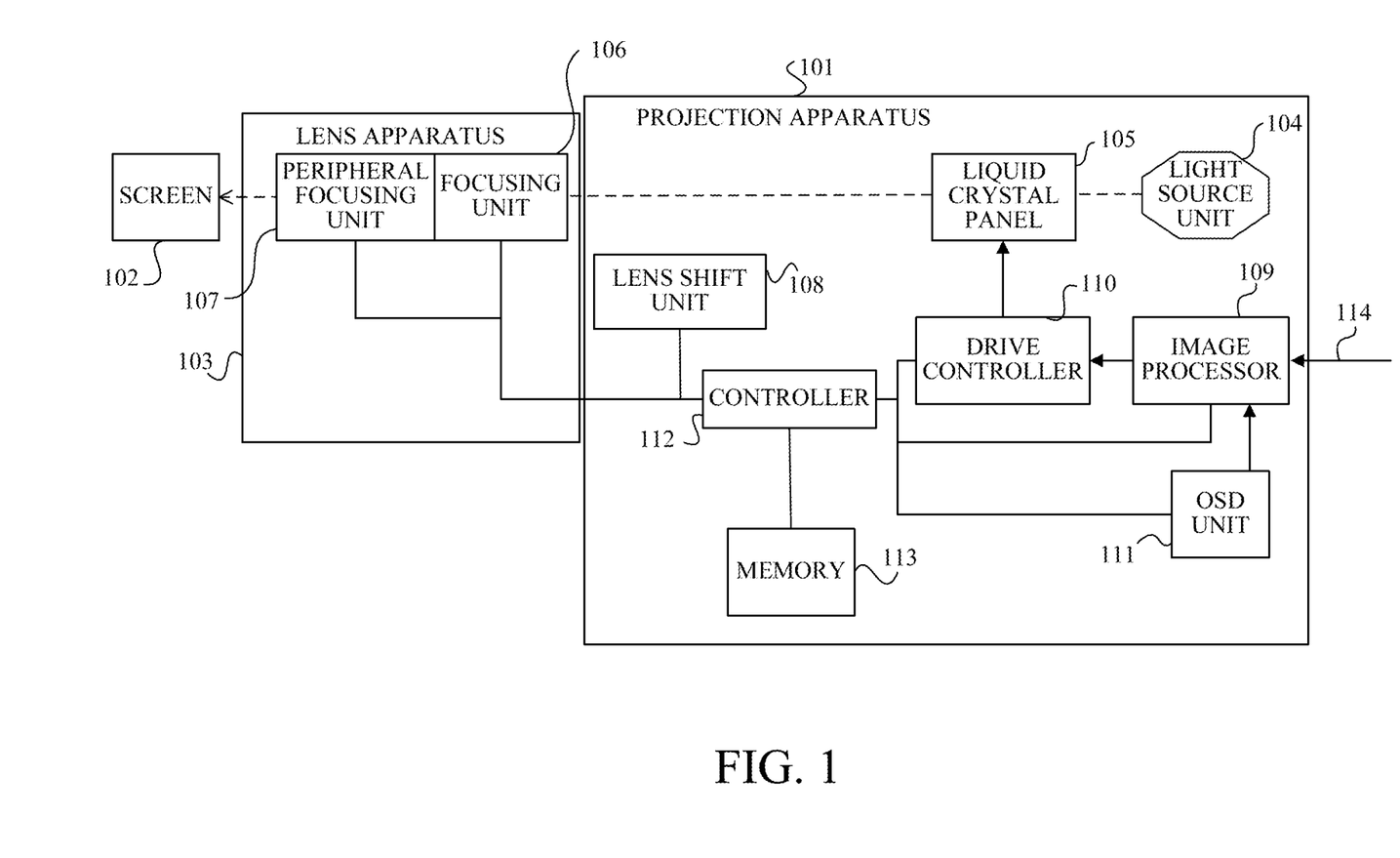
FIG. 1 is a block diagram of a projection system according to one embodiment of the present invention.

Referring now to FIG. 1, a description will be given of a configuration of a projection system according to one embodiment of the present invention. FIG. 1 is a block diagram of the projection system. The projection system includes a projection apparatus 101 and a lens apparatus (projection optical system) 103, and projects a projection image based on image data generated in the projection apparatus 101 via the lens apparatus 103 onto a screen (projection surface) 102. The lens apparatus 103 may be interchangeably attached to the projection apparatus 101 or may be fixed to the projection apparatus 101. The projection apparatus 101 is remotely operable by a remote controller or via a communication line.

The lens apparatus 103 includes a focusing unit (focus lens unit) 106 that performs focusing and a peripheral focusing unit (field curvature adjustment lens unit) 107 that performs peripheral focusing. The focusing and peripheral focusing will be described later. More specifically, each of the focusing unit 106 and the peripheral focusing unit 107 includes a lens unit including one or more lens elements and a manual or electric drive mechanism that drives the lens unit. The lens apparatus 103 may have a zooming function and an aperture adjustment function.

The lens shift unit (shift unit) 108 includes a manual or electric shift (vertical and horizontal drive) mechanism for shifting the lens apparatus 103 so as to move the projection position of the projection image projected on the image 102, and a sensor for detecting the position. The lens shift unit 108 can also acquire the lens shift and offset (shift amount) of the lens apparatus 103.

A light source unit 104 is a light source for a liquid crystal panel 105 such as a lamp or a solid light source. An image formed on the liquid crystal panel 105 is enlarged and focused by the lens apparatus 103 and projected onto the screen 102.

A video signal 114 is input to an image processor 109. Located upstream of the video signal 114 are, for example, a pin plug terminal, a D-Sub terminal, an HDMI (registered trademark) terminal, a DVI terminal, a DP terminal, a LAN terminal, and a USB terminal as a video input terminal. A video signal, a component signal, an analog RGB signal, an HDMI signal, a digital RGB signal, a DP signal, a packetized video signal, a video file, and the like are input to a corresponding video input terminal.

The image processor 109 generates video data (image data) by performing various types of image processing such as signal decoding, an interlace/progressive conversion, a frame rate conversion, a resolution conversion, an aspect conversion, a color correction, and a shape conversion, for the video signal 114. The image processor 109 acquires OSD image data from an on-screen display (referred to as OSD hereinafter) unit 111. The OSD image includes an image such as a menu, a pointer, a message, and a chart.

The image processor 109 outputs image data used for the projection image to the drive controller. The image data is at least one of video data, the OSD image data, and the data obtained by superimposing OSD image data on video data.

A drive controller (panel driver) 110 supplies a timing signal and the video signal (image data) to the liquid crystal panel 105 to drive the liquid crystal panel 105. The liquid crystal panel 105 converts, for example, an electric video signal for each of R, G, and B color components into a two-dimensional video. The liquid crystal panel 105 has a three-panel configuration in this embodiment, but may have another configuration such as a two-panel structure or a single plate structure. The liquid crystal panel 105 may be a transmission type liquid crystal panel or a reflection type liquid crystal panel. Instead of the liquid crystal panel 105, a mirror device or another image display device (light modulation element) may be used.

The controller 112 is a program-controllable processor unit including a CPU (operation unit), RAM, ROM, and the like, and connected to each of the above components via a system line including a system bus and an I/O device. The controller 112 acquires information from each component and controls each component.

A memory 113 is a nonvolatile storage unit, and holds various information such as an internal state, a use history, an adjustment state, a lens state, and a lens type of the projection apparatus 101.

Referring now to FIGS. 2 to 7, a description will be given of a concept of the focusing and the peripheral focusing.

Figure 2:
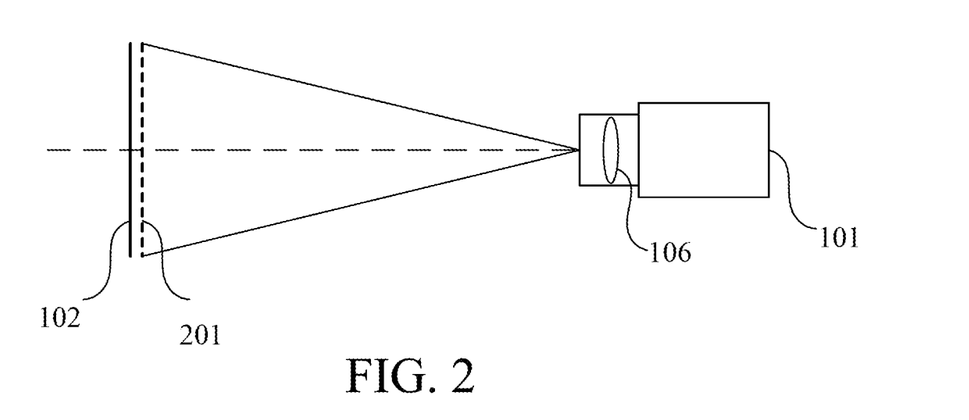
FIG. 2 schematically illustrates a device relationship for focusing.
Figure 3:
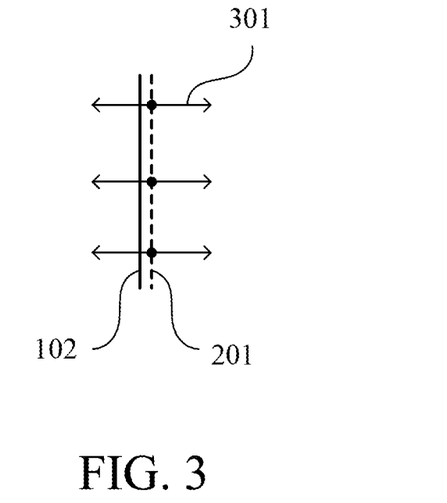
FIG. 3 conceptually illustrates the focusing.

Referring now to FIGS. 2 and 3, a description will be given of the concept of the focusing. FIG. 2 schematically illustrates a device relationship for the focusing. FIG. 3 conceptually illustrates the focusing. In FIGS. 2 and 3, the projection system is in a state where the optical axis of the lens apparatus 103 and the center of the projection surface overlap each other, which will be referred to as a lens shift/offset of 0%. When the lens unit included in the focusing unit 106 is driven in the state of FIG. 2, a focus surface 201 (the in-focus surface) moves along an optical axis direction 301 as illustrated in FIG. 3 and the entire surface of 201 can be focused on the screen 102. In this way, moving the focus surface 201 along the optical axis direction 301 and focusing the entire surface of the focus surface 201 on the screen 102 will be referred to as focusing.

Referring now to FIGS. 4 to 7B, a description will be given of a concept of peripheral focusing. In FIGS. 4 to 7B, the screen 102 is curved. In FIGS. 4A to 7B, the screen 102 is concave toward the projection system side, but may be convex toward the projection system side.

Figure 4:
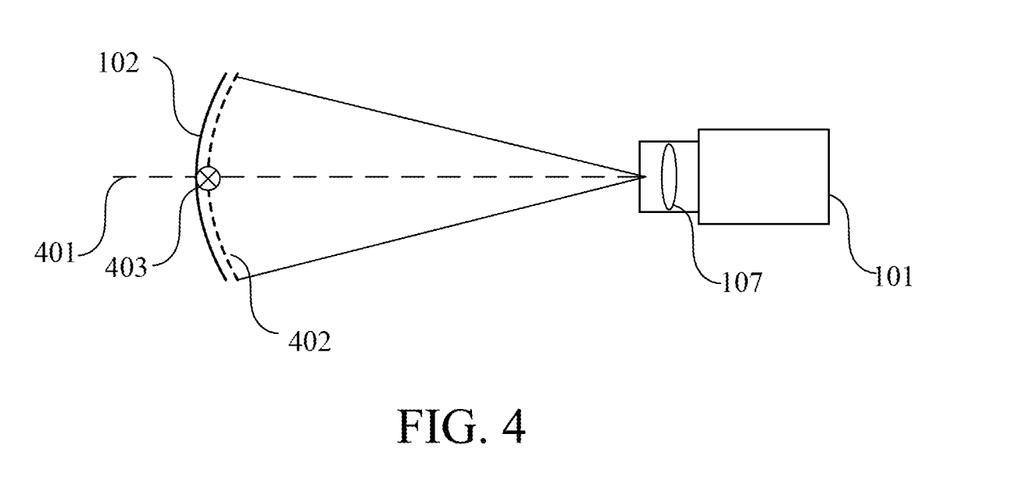
FIG. 4 schematically illustrates a device relationship for peripheral focusing.
Figure 5A:
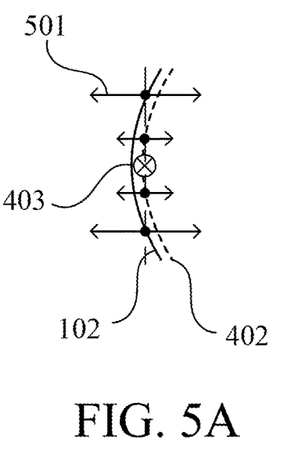
FIGS. 5A and 5B conceptually illustrates the peripheral focusing.
Figure 5B:
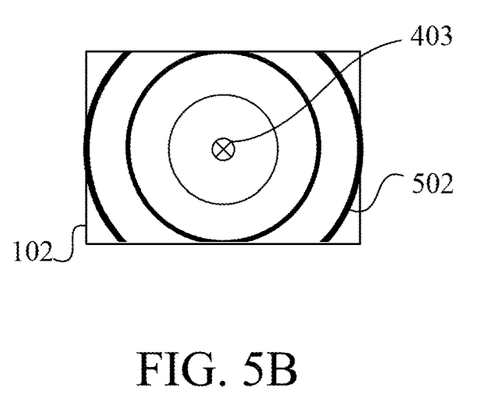

FIG. 4 schematically illustrates the device relationship for the peripheral focusing. FIGS. 5A and 5B conceptually illustrate the peripheral focusing. FIG. 5A illustrates the screen 102 viewed from the lateral direction (direction orthogonal to the optical axis), and FIG. 5B illustrates the screen 102 viewed from the front. In FIGS. 4, 5A, and 5B, the projection system is the lens shift/offset of 0%.

When the lens unit included in the peripheral focusing unit 107 is driven in the state of FIG. 4, a focus surface 402 can be curvedly (non-two-dimensionally) adjusted based on a focus fixed position 403 on an optical axis 401 as illustrated in FIGS. 5A and 5B. Thereby, the entire focus surface 402 can be aligned with the curved screen 102. In other words, a field curvature amount can be adjusted in order to focus on a nonplanar projection surface. In this way, adjusting the curvature of the focus surface 402 and focusing the entire surface of the focus surface 402 on the curved screen 102 is referred to as peripheral focusing. Herein, the fixed focus position 403 is a position where the focus does not vary (or is fixed, or the focus is within the depth of field) while the curvature of the focus surface 402 is adjusted (during the peripheral focusing). An arrow 501 represents a focus variation during the peripheral focusing, and the length is proportional to the magnitude of the variation. In other words, as the distance from the focus fixed position 403 increases, the focus variation amount becomes larger. A concentric circle 502 represents the focus variation degree during the peripheral focusing, and the line thickness is approximately proportional to the focus variation degree. In other words, the focus variation degree increases as the distance from the focus fixed position 403 increases. The concentric circle 502 conceptually illustrates the peripheral focus variation degree, and can be modified within the scope of this purpose.

Figure 6:
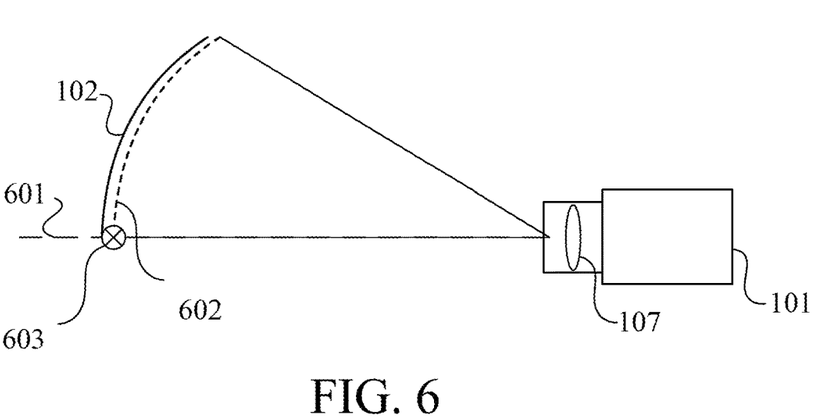
FIG. 6 schematically illustrates a device relationship for the peripheral focusing.
Figure 7A:
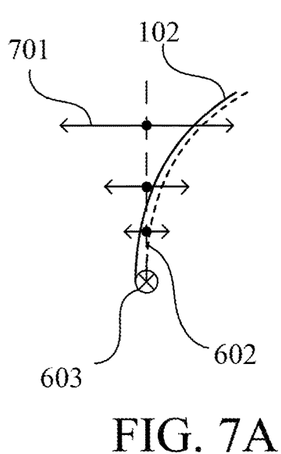
FIGS. 7A and 7B conceptually illustrate the peripheral focusing.
Figure 7B:
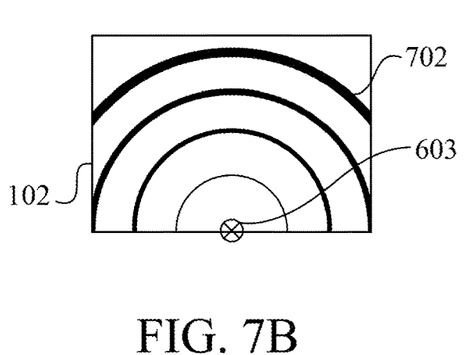

FIG. 6 schematically illustrates the device relationship for the peripheral focusing. FIGS. 7A and 7B conceptually illustrate the peripheral focusing. FIG. 7A illustrates the screen 102 viewed from the lateral direction (direction orthogonal to the optical axis), and FIG. 7B illustrates the screen 102 viewed from the front. In FIGS. 6, 7A, and 7B, the projection system is in a state where the lens shift/offset is 50% (where the optical axis of the lens apparatus 103 is different from the center of the projection surface).

When the lens unit included in the peripheral focusing unit 107 is driven in the state of FIG. 6, a focus surface 602 can be curvedly adjusted based on a focus fixed position 603 on an optical axis 601 as illustrated in FIGS. 7A and 7B. An arrow 701 represents a focus variation during the peripheral focusing, and the length is proportional to the magnitude of the variation. In other words, as the distance from the focus fixed position 603 increases, the focus variation amount becomes larger. A concentric circle 702 represents the focus variation degree during the peripheral focusing, and the line thickness is proportional to the focus variation degree. In other words, the focus variation degree increases as the distance from the focus fixed position 603 increases. The concentric circle 702 conceptually illustrates the peripheral focus variation degree, and can be modified within the scope of this purpose.

The lens shift/offset is not limited to 0% or 50%, and the present invention is applicable to other cases.

Figure 8:
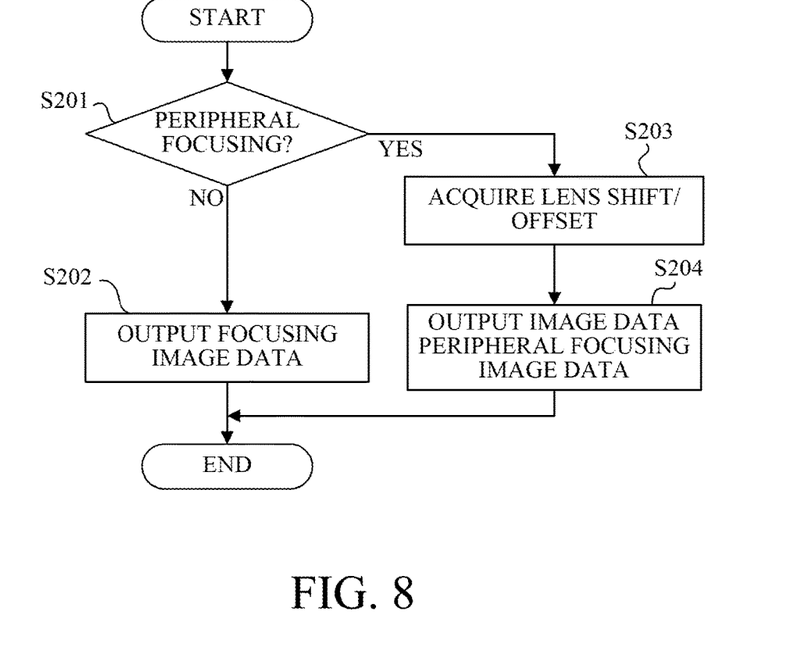
FIG. 8 is a flowchart illustrating processing during the focusing and the peripheral focusing.

Referring now to FIG. 8, a description will be given of processing during the focusing and the peripheral focusing according to this embodiment by the processor. FIG. 8 is a flowchart illustrating the processing during the focusing and the peripheral focusing. In this embodiment, the image processor 109, the OSD unit 111, and the controller 112 serve as a processor.

In the step S201, the controller 112 determines whether the peripheral focusing unit 107 is operated. When the peripheral focusing unit 107 is operated, the flow proceeds to the step S203, and when the peripheral focusing unit 107 is not operated, the flow proceeds to the step S202.

In the step S202, the image processor 109 outputs the image data for the focusing during the focusing by the controller 112. The image data for the focusing includes the OSD image data as the projection image for assisting the focusing.

Figures 9A, 9B:
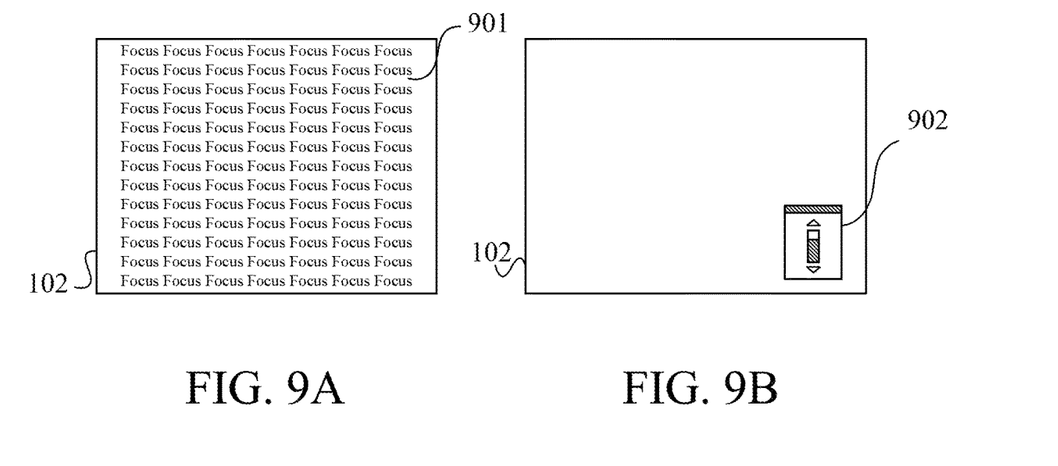
FIGS. 9A and 9B illustrate illustrative projection images displayed during the focusing.

FIGS. 9A and 9B illustrate illustrative projection images based on the image data for the focusing displayed during the focusing. FIG. 9A illustrates an OSD image 901 called a chart composed of a character and a figure. FIG. 9B illustrates an OSD image 902 called a gauge associated with the operation of the user. An OSD image indicating that the projection apparatus 101 is in the focusing mode or an OSD image indicating the operation status from the remote controller may be displayed. An image in which the OSD images 901 and 902 are superimposed may be displayed. An image in which at least one of the OSD images 901 and 902 is superimposed on the video based on the video signal 114 may be displayed.

This embodiment can assist focusing by displaying on the screen 102 the projection image including the above information on the focus fixed position during the focusing. The information on the fixed focus position may be included in the projection image during the focusing. When the projection image includes the information on the fixed focus position during the focusing, the peripheral focusing can be easily made during the peripheral focusing following the focusing.

In the step S203, the controller 112 acquires the lens shift/offset from the lens shift unit 108.

In the step S204, the image processor 109 outputs image data for the peripheral focusing during the peripheral focusing by the controller 112. The image data for the peripheral focusing includes data (information on the sensitivity) used to display as a projection image the sensitivity indicating a relationship between a unit operation amount of the lens unit included in the peripheral focusing unit 107 and a focus variation amount at a predetermined position on the focus surface. When the lens apparatus 103 is fixed onto the projection apparatus 101 (or cannot be interchanged), the memory 113 stores the information on the sensitivity. When the lens apparatus 103 is interchangeably (or detachably) attached to the projection apparatus 101, the information on the sensitivity may be acquired directly from the lens apparatus 103 or may be generated by the OSD unit 111 based on the information acquired (input) from the lens apparatus 103. The information acquired from the lens apparatus 103 is, for example, information indicating the type of the lens apparatus 103, and in this case, the OSD unit 111 acquires the information on the sensitivity corresponding to the lens apparatus 103 from the memory 113. When the lens shift/offset acquired in the step S203 is not 0, the OSD unit 111 generates the image data for the peripheral focusing using the information on the sensitivity and the lens shift/offset.

Figure 10A:
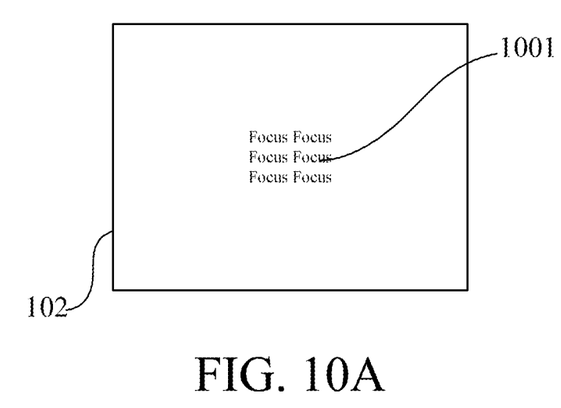
FIGS. 10A to 10D illustrate illustrative projection images displayed during the peripheral focusing.
Figure 10B:
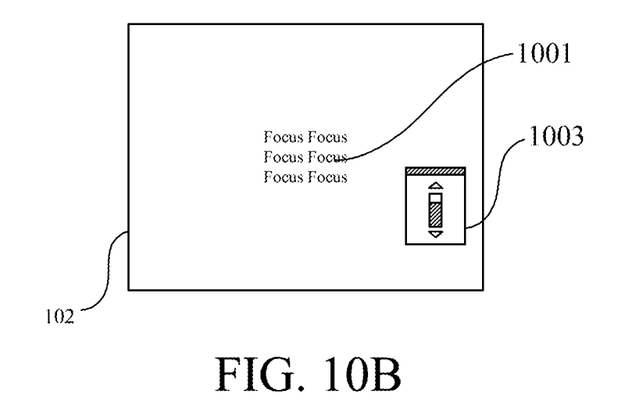
Figure 10C:
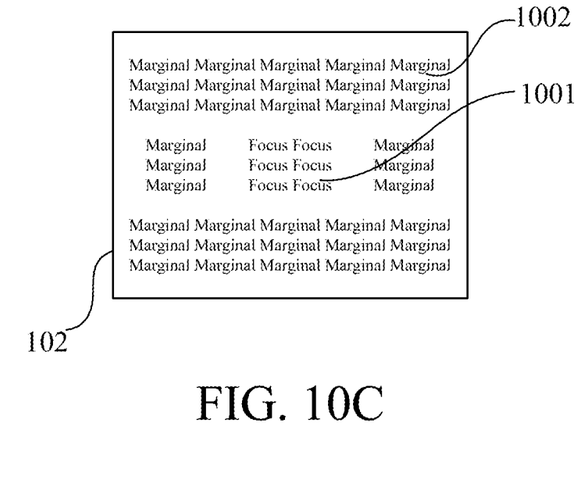
Figure 10D:
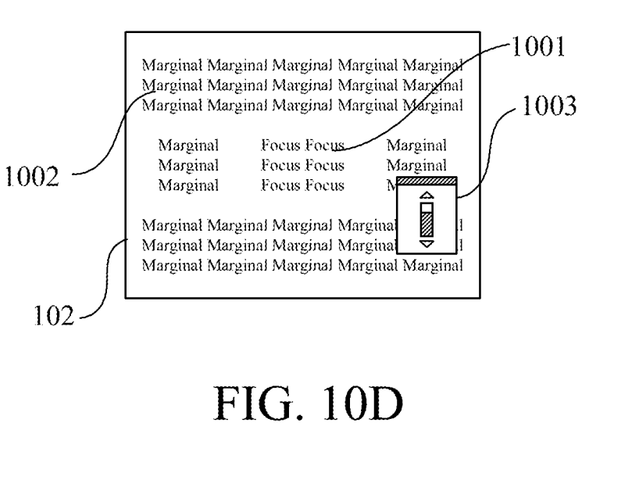

FIGS. 10A to 10D illustrate illustrative projection images based on the image data for the focusing displayed during the focusing and illustrative projection images based on the image data for the peripheral focusing displayed during the peripheral focusing, when the focus fixed position is located at the center of the projection image. The projection image in FIG. 10A illustrates a chart 1001 representing a focus fixed position as an example of the sensitivity. Due to such a projection image, the user can easily perform the focusing and the peripheral focusing using the chart 1001. The projection image of FIG. 10C illustrates, in addition to the chart 1001, a portion 1002 where the focus is varied by the peripheral focusing is displayed around the chart 1001. Due to such a projection image, the user can more easily perform the focusing and the peripheral focusing using the chart 1001. As illustrated in FIGS. 10B and 10D, a gauge 1003 may be added to the projection images in FIGS. 10A and 10C.

Figure 11:
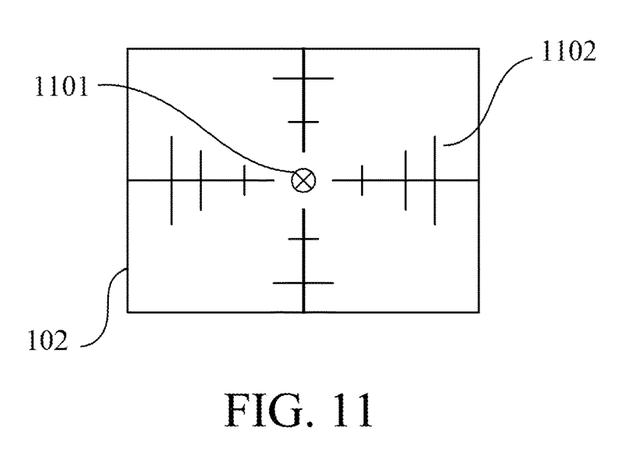
FIG. 11 illustrate an illustrative projection image displayed during the peripheral focusing.
Figure 12:
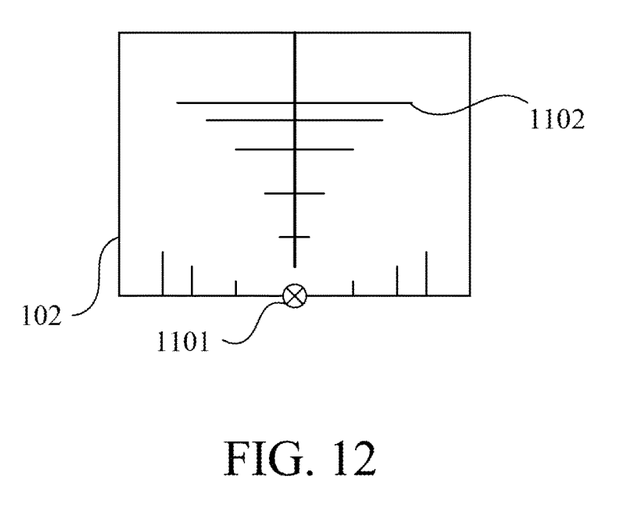
FIG. 12 illustrates an illustrative projection image displayed during the peripheral focusing.

While the projection images in FIGS. 10A to 10D display the charts composed of characters, but the present invention is not limited to this embodiment. The projection image may display a chart other than characters. FIG. 11 illustrates an illustrative projection image in which the chart displayed in the projection image of FIG. 10C is replaced with a mark. FIG. 12 illustrates an illustrative projection image based on the image data for the peripheral focusing displayed during the peripheral focusing when the lens shift/offset is 50% in the vertical direction and 0% in the horizontal direction, or when the focus fixed position is located at the lower end of the projection image. The projection images in FIGS. 11 and 12 display a mark 1101 representing the focus fixed position and a mark 1102 representing a portion where the focus varies. The length of the mark 1102 is proportional to the focus variation amount.

Figure 13:
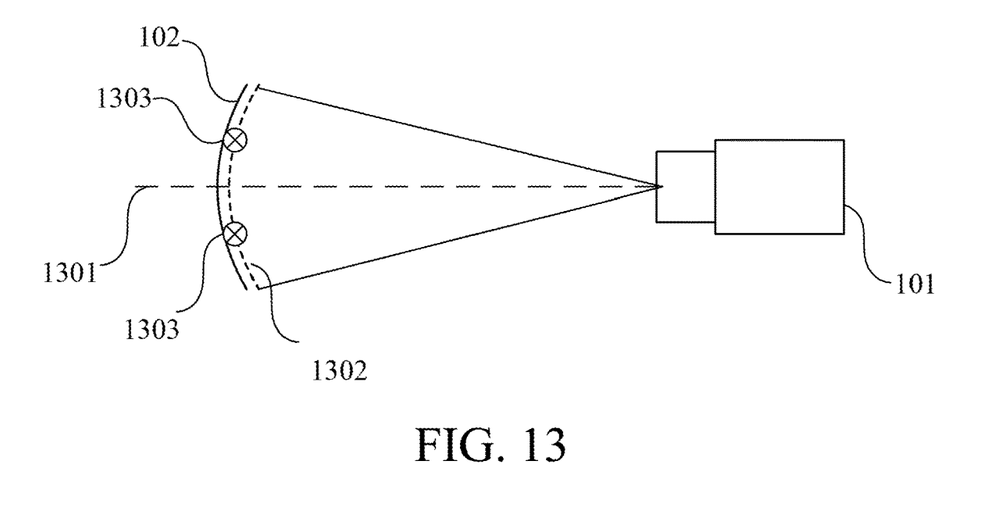
FIG. 13 schematically illustrates a device relationship for the peripheral focusing.
Figure 14A:
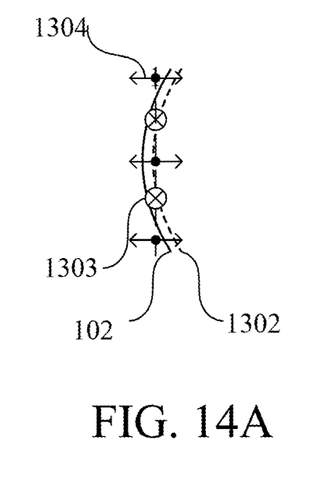
FIGS. 14A and 14B conceptually illustrate the peripheral focusing.
Figure 14B:
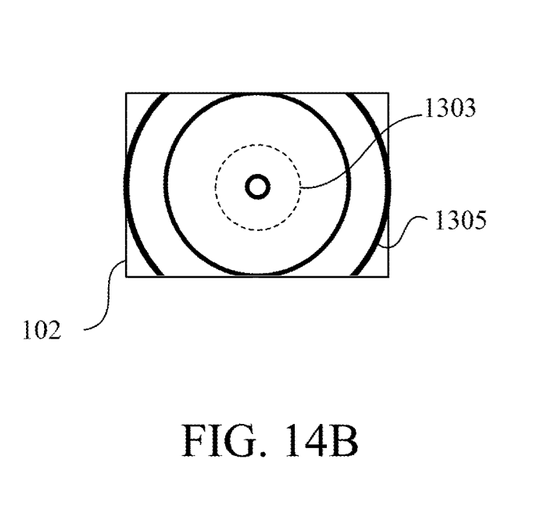

This embodiment has described the focus fixed position located on the optical axis, but the present invention is not limited to this embodiment. The focus fixed position is determined by which lens element in the lens unit included in the peripheral focusing unit 107 is driven during the peripheral focusing, and may not be located on the optical axis. FIG. 13 schematically illuminates the device relationship for the peripheral focusing when the focus fixed position is not on the optical axis. FIGS. 14A and 14B conceptually illustrate the peripheral focusing when the focus fixed position is not located on the optical axis. FIG. 14A illustrates the screen 102 viewed from the lateral direction (direction orthogonal to the optical axis), and FIG. 14B illustrates the screen 102 viewed from the front.

In FIG. 13, the focus fixed position 1303 is not located on an optical axis 1301. When the peripheral focusing is performed in the state of FIG. 13, the curvature of a focus surface 1302 can be adjusted based on a focus fixed position 1303. An arrow 1304 represents a focus variation during the peripheral focusing, and the length is proportional to the magnitude of the variation. In FIG. 14A, the focus varies on the optical axis side and the outside of the focus fixed position 1303 in the opposite directions. In this peripheral focusing mechanism, the peripheral focus fixed position does not have a point shape but has an annular shape. In FIG. 14B, a concentric circle 1305 represents the focus variation degree during the peripheral focusing, and the line thickness is proportional to the focus variation degree. In other words, the focus variation degree increases as the distance from the annular focus fixed position 1303 increases.

Figure 15A:
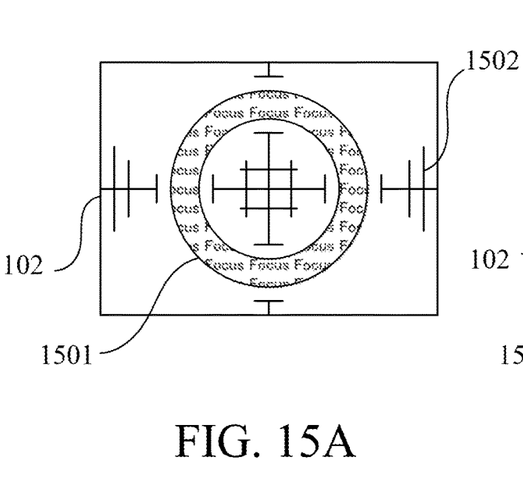
FIGS. 15A and 15B illustrate illustrative projection images displayed during the peripheral focusing.
Figure 15B:
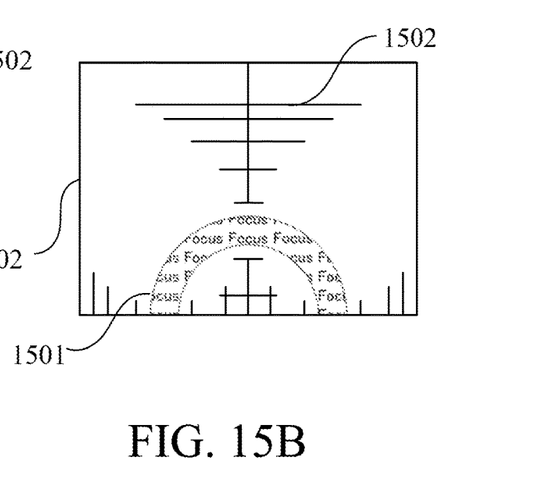

When the focus fixed position is annular, the image processor 109 may output the image data for the peripheral focusing so as to display the projection image illustrated in FIGS. 15A and 15B during the peripheral focusing. FIGS. 15A and 15B illustrate illustrative projection images based on the image data for the peripheral focusing that is displayed during peripheral focusing. The projection image of FIG. 15A illustrates a focus fixed position 1501 in a ring shape, and marks 1502 indicating that the focus is varied by the peripheral focusing inside and outside the fixed focus position 1501. In the projection image in FIG. 15B having a lens shift/offset, the focus fixed position 1501 is displayed on the lower side of the projection image. FIG. 15B illustrates an example where the lens shift/offset is +50% in the vertical direction.

As described above, the configuration of the present embodiment enables the user to easily obtain a focus during the peripheral focusing.

The above embodiment can provide a projection apparatus and a storage medium that allow the user to easily provide focusing in the peripheral focusing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002724, filed on Jan. 10, 2019, which is hereby incorporated by reference herein in its entirety.

What is claimed is:

1. A projection apparatus configured to project a projection image based on image data through a projection optical system that includes a field curvature adjustment lens unit configured to adjust a field curvature in order to focus on a nonplanar projection surface, the projection apparatus comprising:

a processor configured to generate the image data including information on a focus fixed position where a focus does not change on the projection surface in adjusting the field curvature.

2. The projection apparatus according to claim 1, further comprising a shift unit configured to shift the projection optical system so as to move a projection position of the projection image, wherein the processor generates the image data using the information and a shift amount of the projection optical system.

3. The projection apparatus according to claim 1, wherein the projection optical system further includes a focus lens unit for focusing in an optical axis direction of the projection optical system, and the processor generates the image data including the focus fixed position when the focus lens unit performs focusing.

4. The projection apparatus according to claim 1, wherein the processor generates the image data including information indicating a relationship between a unit operation amount of the field curvature adjustment lens unit and a focus variation amount at a predetermined position on the projection surface.

5. The projection apparatus according to claim 1, wherein the projection optical system is fixed onto the projection apparatus.

6. The projection apparatus according to claim 1, wherein the projection optical system is interchangeably attached to the projection apparatus, and wherein the processor acquires information indicating a relationship between a unit operation amount of the field curvature adjustment lens unit and a focus variation amount at a predetermined position on the projection surface, from the projection optical system mounted on the projection apparatus.

7. The projection apparatus according to claim 1, further comprising a memory configured to store information indicating a relationship between a unit operation amount of the field curvature adjustment lens unit and a focus variation amount at a predetermined position of the projection surface corresponding to the projection optical system, wherein the projection optical system is interchangeably attached to the projection apparatus, and wherein the processor acquires information on the projection optical system from the projection optical system, and information indicating a relationship between a unit operation amount of the field curvature adjustment lens unit and a focus variation amount at a predetermined position on the projection surface from the memory using the information on the projection optical system.

8. A non-transitory computer-readable storage medium storing a program that causes to execute a control method a computer in a projection apparatus configured to project a projection image based on image data through a projection optical system that includes a field curvature adjustment lens unit configured to adjust a field curvature in order to focus on a nonplanar projection surface, the control method comprising generating the image data including information on a focus fixed position where a focus does not change on the projection surface in adjusting the field curvature.

* * * * *